United States Patent
Stambaugh et al.

(10) Patent No.: US 9,423,413 B2
(45) Date of Patent: Aug. 23, 2016

(54) ON-LINE FLUID SENSOR

(75) Inventors: Deron Stambaugh, Waterman, IL (US); Mark Burleson, Aurora, IL (US); Anthony Russo, Elmhurst, IL (US)

(73) Assignee: TOUCHSENSOR TECHNOLOGIES, LLC, Wheaton, IL (US)

( * ) Notice: Subject to any disclaimer, the term of this patent is extended or adjusted under 35 U.S.C. 154(b) by 956 days.

(21) Appl. No.: 11/744,538

(22) Filed: May 4, 2007

(65) Prior Publication Data
US 2008/0001766 A1  Jan. 3, 2008

Related U.S. Application Data

(60) Provisional application No. 60/797,450, filed on May 4, 2006.

(51) Int. Cl.
| *H01H 5/00* | (2006.01) |
| *G01P 13/00* | (2006.01) |
| *G01F 1/56* | (2006.01) |
| *G01F 1/712* | (2006.01) |
| *G01F 15/14* | (2006.01) |

(52) U.S. Cl.
CPC ............. *G01P 13/0006* (2013.01); *G01F 1/56* (2013.01); *G01F 1/712* (2013.01); *G01F 15/14* (2013.01)

(58) Field of Classification Search
CPC ........ G01R 27/13; G01N 27/14; G01S 13/08
USPC ............... 200/303–307, 182–193, 291
See application file for complete search history.

(56) References Cited

U.S. PATENT DOCUMENTS

| 4,045,650 A | * | 8/1977 | Nestor .......................... 200/556 |
| 4,090,404 A | * | 5/1978 | Dupont et al. ............. 73/114.43 |
| 4,350,039 A | | 9/1982 | van Dyke |
| 4,352,159 A | | 9/1982 | Colby |
| 4,383,444 A | | 5/1983 | Beaman |
| 4,438,995 A | * | 3/1984 | Fisher et al. .................. 439/147 |
| 4,451,894 A | | 5/1984 | Dougherty et al. |
| 4,734,549 A | * | 3/1988 | Naoi et al. ................. 200/61.41 |
| 4,749,988 A | | 6/1988 | Berman et al. |
| 4,992,633 A | * | 2/1991 | Cyphers ................... 200/81.9 R |
| 5,142,271 A | * | 8/1992 | Bailey et al. ................. 340/606 |
| 5,423,214 A | | 6/1995 | Lee |
| 5,437,184 A | | 8/1995 | Shillady |
| 5,613,399 A | | 3/1997 | Hannan |

(Continued)

FOREIGN PATENT DOCUMENTS

| DE | 8816063 | 4/1989 |
| DE | 9202970 U1 | 7/1992 |

(Continued)

OTHER PUBLICATIONS

AD Semiconductor Specification (Dec. 2004).

(Continued)

*Primary Examiner* — Shawki S Ismail
*Assistant Examiner* — Lisa Homza
(74) *Attorney, Agent, or Firm* — Barnes & Thornburg LLP

(57) ABSTRACT

A touch sensor is associated with a housing that is adapted for attachment to the outer perimeter of a fluid conduit. The housing can be attached to the fluid conduit such that the touch sensor can detect the presence of fluid within the fluid conduit. The output of the touch sensor can be used by an indicator or processor.

13 Claims, 1 Drawing Sheet

(56) References Cited

U.S. PATENT DOCUMENTS

| | | |
|---|---|---|
| 6,125,696 A | 10/2000 | Hannan et al. |
| 6,138,508 A | 10/2000 | Hannan et al. |
| 6,320,282 B1 | 11/2001 | Caldwell |
| 6,444,928 B2 * | 9/2002 | Okamoto et al. ............. 200/5 A |
| 6,528,748 B2 * | 3/2003 | Harris et al. ............ 200/81.9 M |
| 6,812,417 B1 * | 11/2004 | Lovell ........................ 200/61.25 |
| 6,897,390 B2 * | 5/2005 | Caldwell et al. ............. 200/512 |
| 7,017,409 B2 | 3/2006 | Zielinski et al. |
| 7,026,861 B2 | 4/2006 | Steenwyk |
| 7,098,414 B2 * | 8/2006 | Caldwell ...................... 200/310 |
| 7,218,498 B2 | 5/2007 | Caldwell |
| 7,260,438 B2 | 8/2007 | Caldwell et al. |
| 7,373,817 B2 | 5/2008 | Burdi |
| 7,482,818 B2 * | 1/2009 | Greenwald et al. .......... 324/639 |
| 7,501,596 B2 * | 3/2009 | Bradley et al. .............. 200/81.8 |
| 2002/0116999 A1 | 8/2002 | Heger |
| 2007/0156261 A1 | 7/2007 | Caldwell et al. |

FOREIGN PATENT DOCUMENTS

| | | |
|---|---|---|
| EP | 1134557 | 9/2001 |
| WO | WO 2004/104529 | 12/2004 |

OTHER PUBLICATIONS

International Search Report and Written Opinion issued in Int'l Pat. Appl. No. PCT/US2007/068235 dated Mar. 31, 2008.

* cited by examiner

ON-LINE FLUID SENSOR

CROSS-REFERENCE TO RELATED APPLICATIONS

This application claims priority from and incorporates by reference the disclosure of U.S. Provisional Patent Application No. 60/797,450, filed on May 4, 2006.

BACKGROUND OF THE INVENTION

This present invention is directed to a fluid sensor for detecting fluid inside a tube or other fluid conduit, for example, a pipe or hose. More particularly, the present invention is directed to a fluid sensor that can be mounted on or to the outer surface of a fluid conduit without penetrating its pressure barrier.

Fluid sensors are known in the art. Conventional fluid sensors, however, typically are installed within or in line with a fluid conduit. As such, conventional fluid sensors typically interact with the fluid they are intended to detect. This interaction can be undesirable for several reasons. For one, this interaction can substantially disturb the flow of the fluid through the fluid conduit. For another, the sensor can be damaged by exposure to the fluid, particularly in applications where the fluid is corrosive or applications involving high flow rates or turbulent flow. Further, such "in-line" applications typically require breaching the pressure barrier in order to install the sensor and/or related hardware and accessories. As such, conventional sensors typically cannot be installed while the fluid conduit is "on line" or in use. Moreover, any penetrations in the pressure barrier that may be required for installation and/or operation of a conventional fluid sensor can compromise the structural integrity of the fluid conduit and introduce additional potential leak paths.

DETAILED DESCRIPTION OF THE DRAWINGS

Figure 1:
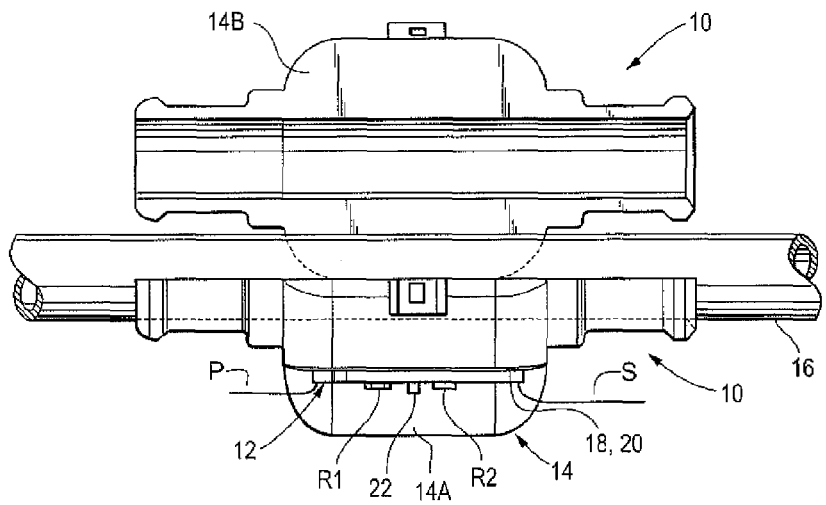
FIG. 1 is a plan view of a fluid sensor according to the present invention partially installed to a tube.
Figure 2:
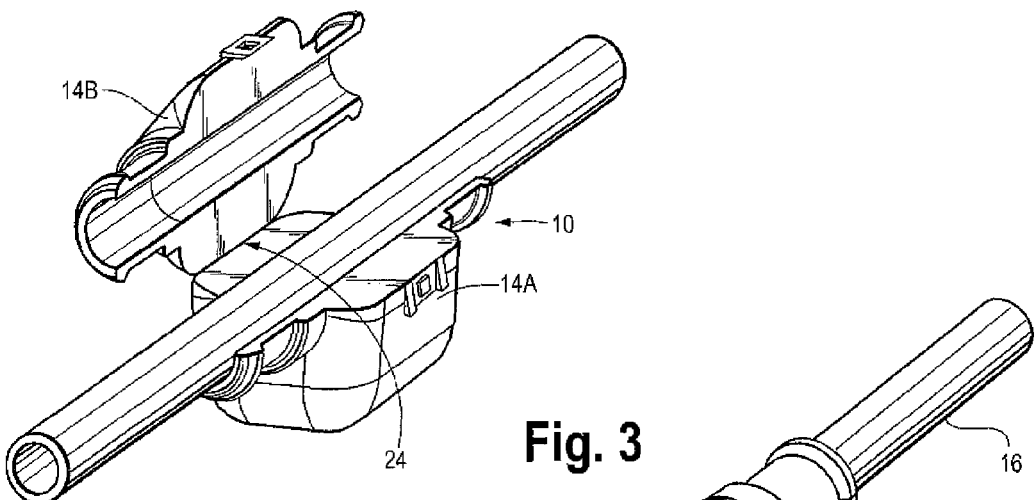
FIG. 2 is a perspective view of a fluid sensor according to the present invention partially installed to a tube.
Figure 3:
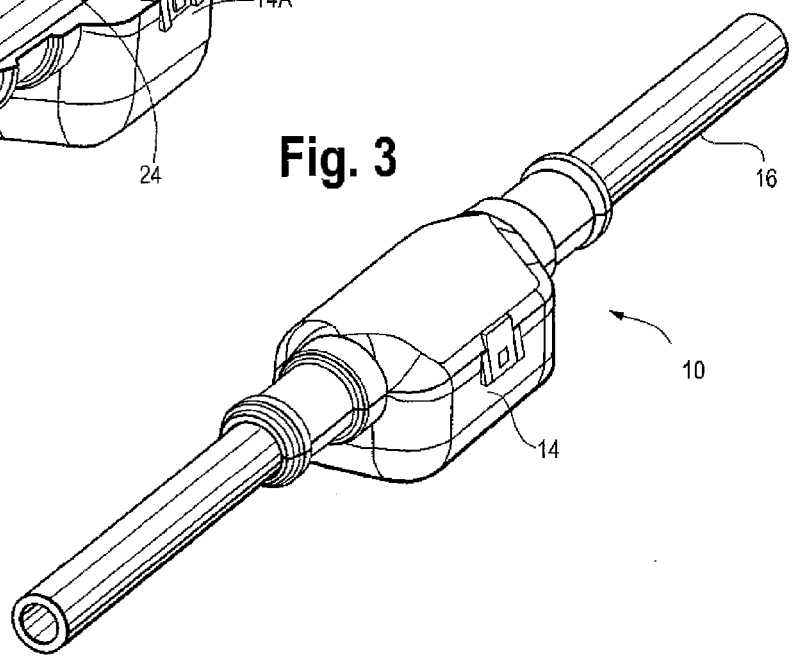
FIG. 3 is a perspective view of a fluid sensor according to the present invention installed to a tube.

A preferred embodiment of a fluid sensor 10 according to the present invention includes a touch sensor 12 associated with a housing 14 that is adapted for installation to the outside of a fluid conduit 16, for example, a pipe, tube, or hose, made of non-conductive material, for example, plastic or rubber. Fluid sensor 10 is especially well-suited for use in connection with rubber and other flexible tubes and hoses because the nature of such flexible tubes and hoses allows for close conformance of fluid sensor 10 to such tubes or hoses and elimination or minimization of air gaps between such tubes and hoses and fluid sensor 10, as discussed further below. Fluid conduit 16 is illustrated in the drawings as being substantially cylindrical. Fluid sensor 10, however, can be adapted for use with non-cylindrical conduits and open channels, as well, as would be understood by one skilled in the art.

Housing 14 is illustrated as a molded plastic clam shell having two portions 14A,14B joined by a living hinge 24. The interior surfaces of housing portions 14A,14B are adapted for close conformance to the outer surface of fluid conduit 16 when installed thereto, as would be understood by one skilled in the art. Because the presence of air gaps between the inner surface of housing 14 and the outer surface of fluid conduit 16 can adversely affect the performance of fluid sensor 10, housing 14 preferably is adapted for installation to fluid conduit 16 in a manner that eliminates or minimizes air gaps between the inner surface of housing 14 and the outer surface of fluid conduit 16. Housing 14 preferably includes a positive lock latching mechanism, for example, a molded-in snap-lock assembly feature, such as snap-lock assembly 28, for securing housing 14 to fluid conduit 16, as would be understood by one skilled in the art. In alternate embodiments, housing 14 can take other forms and be made of different materials and/or by different processes. For example, housing 14 can be formed as two distinct pieces made of any suitable material that are later joined using one or more of snap-assembly features, a hinge mechanism, a tongue and groove or tab and slot arrangement, hose clamps, or other means, as would be understood by one skilled in the art. Also, housing 14 can be formed as two distinct pieces including one or more flanges to facilitate assembly using clips, screws, or other fasteners.

Touch sensor 12 is associated with the inner surface of housing 14 such that touch sensor 12 can detect the presence of fluid within fluid conduit 16. Preferably, touch sensor 12 is molded into housing 14 using injection molding, over-molding, or other molding techniques. U.S. Pat. No. 6,897,390, the disclosure of which is incorporated herein by reference, illustrates certain molding techniques that could be used to practice the present invention. Alternatively, touch sensor 12 could be mounted on an inner or outer surface of housing 14. In such embodiments, touch sensor 12 could be mounted directly on such inner or outer surface or it could be fabricated on a separate, preferably flexible, substrate which in turn would be mounted on an inner or outer surface of housing 14. Molding touch sensor 12 into housing 14, however, is preferred over surface mounting touch sensor 12 because a molded-in touch sensor is less susceptible to damage, particularly during and after installation of fluid sensor to fluid conduit 16.

Touch sensor 12 preferably is a field effect touch sensor provided by TouchSensor Technologies of Wheaton, Ill. and/or as disclosed in one or more of U.S. Pat. Nos. 5,594,222, 6,310,611, and 6,320,282 and United States Publication No. 2003/0122432 A1, the disclosures of which are incorporated herein by reference. Other types of sensors may be used with the present invention, as well.

Preferably, touch sensor 12 includes a first sensing electrode 18 having a closed geometric form and a second sensing electrode 20 in the form of a narrow electrode that substantially surrounds first sensing electrode 18. (FIG. 1 illustrates second sensing electrode 20; first sensing electrode 18 is "behind" second sensing electrode 20.) Alternatively, first sensing electrode 18 and second sensing electrode 20 can have other shapes and spatial relationships as would be understood by one skilled in the art. In some embodiments, second sensing electrode 20 can be omitted. Preferably, touch sensor 12 also includes an integrated control circuit 22 located in close proximity to first sensing electrode 18 and (when used) second sensing electrode 20. Integrated control circuit 22, when used, preferably is embodied as a TS-100 integrated circuit chip provided by TouchSensor Technologies, LLC of Wheaton, Ill. The TS-100 chip is an embodiment of the control circuit disclosed in U.S. Pat. No. 6,320,282. In such embodiments, touch sensor 12 preferably further includes first and second resistors R1,R2 coupled, respectively, to first and second sensing electrodes 18,20 and to integral control circuit 22.

Fluid sensor 10 also includes power lead P and signal lead S for providing power to touch sensor 12 and conveying a signal from the output of touch sensor 12 to a remote circuit or device, for example, a remote processor, indicator, or display.

With fluid sensor 10 installed to fluid conduit 16, touch sensor 12 can detect the presence or absence of fluid within fluid conduit 16, as would be understood to one skilled in the art. The output of touch sensor 12 is indicative of the presence or absence of fluid within the portion of fluid conduit 16 proximate touch sensor 12 of fluid sensor 16. Plural fluid sensors 10 could be used to determine the flow rate of a fluid in fluid conduit 16. This could be accomplished by installing two or more fluid sensors 10 on fluid conduit 16 at predetermined spacing. A processor receiving the outputs of the two or more fluid sensors could determine flow rate in fluid conduit 16, particularly at the time flow is initially established, as a function of the spacing between fluid sensors 10, the size of fluid conduit 16, the elapsed time between a first such sensor detecting fluid and a second such sensor detecting fluid in fluid conduit 16, and/or any other relevant factors, as would be understood by one skilled in the art.

The embodiments illustrated and described herein are intended to be illustrative and not limiting. One skilled in the art would recognize that these embodiments could be modified without departing from the scope of the invention, which is defined by the following claims.

The invention claimed is:

1. A fluid sensor comprising:
    a housing adapted to substantially surround a fluid conduit in close conformance thereto; and
    a touch sensor molded into said housing;
    wherein said touch sensor detects the presence or absence of a fluid within said fluid conduit proximate said sensor;
    wherein said housing is adapted to conform to said fluid conduit such that substantially no air gap exists between said housing and said fluid conduit; and
    wherein said touch sensor outputs a signal indicative of the presence or absence of said fluid within said fluid conduit proximate said sensor.

2. The fluid sensor of claim 1 wherein said housing is adapted for attachment to said fluid conduit without breaching a pressure barrier of said fluid conduit.

3. The fluid sensor of claim 2 wherein said fluid conduit is substantially tubular and said housing is adapted for engagement about the circumference of said fluid conduit.

4. The fluid sensor of claim 2 wherein said housing comprises a first portion, a second portion, and a living hinge coupling said first portion and said second portion.

5. The fluid sensor of claim 4 wherein said housing further comprises a positive lock latching mechanism.

6. The fluid sensor of claim 4 wherein said housing comprises a clam shell housing.

7. The fluid sensor of claim 4 wherein said first portion of said housing includes a first section adapted for conforming to said fluid conduit and a second section depending from said first section adapted to contain said touch sensor.

8. The fluid sensor of claim 2 wherein said housing comprises a first portion, a second portion, and means for coupling said first portion and said second portion.

9. The fluid sensor of claim 1 wherein said fluid is a liquid.

10. The fluid sensor of claim 1, said touch sensor comprising a first sensing electrode, a second sensing electrode substantially surrounding said first sensing electrode, and an integral control circuit in close proximity to said first and second sensing electrodes.

11. The fluid sensor of claim 1 wherein said housing is injection molded about said touch sensor.

12. The fluid sensor of claim 1 wherein said housing is overmolded about said touch sensor.

13. The fluid sensor of claim 1, wherein said touch sensor is encapsulated into said housing.

* * * * *